United States Patent
Tang (10) Patent No.: US 10,924,971 B2
(45) Date of Patent: Feb. 16, 2021

(54) COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 53 days.

(21) Appl. No.: 16/081,020

(22) PCT Filed: May 11, 2016

(86) PCT No.: PCT/CN2016/081715
§ 371 (c)(1),
(2) Date: Aug. 29, 2018

(87) PCT Pub. No.: WO2017/193307
PCT Pub. Date: Nov. 16, 2017

(65) Prior Publication Data
US 2019/0098542 A1    Mar. 28, 2019

(51) Int. Cl.
*H04W 36/00*   (2009.01)
*H04W 88/04*   (2009.01)
(Continued)

(52) U.S. Cl.
CPC .......... *H04W 36/03* (2018.08); *H04B 17/364* (2015.01); *H04W 4/70* (2018.02);
(Continued)

(58) Field of Classification Search
None
See application file for complete search history.

(56) References Cited

U.S. PATENT DOCUMENTS

2014/0036656 A1   2/2014   Chou
2014/0036664 A1   2/2014   Han
(Continued)

FOREIGN PATENT DOCUMENTS

CN   103747507 A    4/2014
CN   105101046 A    11/2015
(Continued)

OTHER PUBLICATIONS

International Search Report in international application No. PCT/CN2016/081715, dated Jan. 25, 2017.
(Continued)

*Primary Examiner* — Saba Tsegaye
(74) *Attorney, Agent, or Firm* — Ladas & Parry, LLP (57) ABSTRACT

Provided are a communication method, a terminal device, a network device and a storage medium, capable of reducing time delay and improving communication quality. The method comprises: a terminal device determines that first service communication currently being performed on a Uu interface basis cannot satisfy first service communication requirements; or when the terminal device determines first service communication currently being performed on a Uu interface basis, wireless link failure occurs; the terminal device uses a terminal direct connection D2D communication means to perform the first service communication.

20 Claims, 4 Drawing Sheets

(51) Int. Cl.

| | | |
|---|---|---|
| *H04W 36/30* | (2009.01) | |
| *H04W 76/18* | (2018.01) | |
| *H04W 4/70* | (2018.01) | |
| *H04W 72/04* | (2009.01) | |
| *H04W 56/00* | (2009.01) | |
| *H04W 76/11* | (2018.01) | |
| *H04W 8/00* | (2009.01) | |
| *H04W 76/14* | (2018.01) | |
| *H04W 28/02* | (2009.01) | |
| *H04B 17/364* | (2015.01) | |
| *H04W 76/00* | (2018.01) | |
| *H04W 92/18* | (2009.01) | |

(52) U.S. Cl.
CPC ....... *H04W 8/005* (2013.01); *H04W 28/0268* (2013.01); *H04W 36/00* (2013.01); *H04W 36/0079* (2018.08); *H04W 36/305* (2018.08); *H04W 56/0025* (2013.01); *H04W 56/0045* (2013.01); *H04W 56/0065* (2013.01); *H04W 72/0466* (2013.01); *H04W 76/11* (2018.02); *H04W 76/14* (2018.02); *H04W 76/18* (2018.02); *H04W 88/04* (2013.01); *H04W 36/0022* (2013.01); *H04W 72/042* (2013.01); *H04W 76/00* (2013.01); *H04W 92/18* (2013.01)

(56) References Cited

U.S. PATENT DOCUMENTS

| | | |
|---|---|---|
| 2014/0036769 A1 | 2/2014 | Stojanovski |
| 2014/0036792 A1 | 2/2014 | Li |
| 2014/0036793 A1 | 2/2014 | Johnsson |
| 2014/0036794 A1 | 2/2014 | Koc |
| 2014/0036795 A1 | 2/2014 | Martinez Tarradell |
| 2014/0036796 A1 | 2/2014 | Etemad |
| 2014/0036876 A1 | 2/2014 | Li |
| 2014/0038623 A1 | 2/2014 | Davydov |
| 2014/0040498 A1 | 2/2014 | Oyman |
| 2014/0040504 A1 | 2/2014 | Gupta |
| 2014/0112300 A1 | 4/2014 | Han |
| 2014/0314049 A1 | 10/2014 | Cho et al. |
| 2015/0139197 A1 | 5/2015 | He |
| 2015/0156702 A1 | 6/2015 | Stojanovski et al. |
| 2015/0181564 A1 | 6/2015 | Rao |
| 2015/0189521 A1 | 7/2015 | Chou et al. |
| 2015/0189591 A1 | 7/2015 | Koc et al. |
| 2015/0201375 A1 | 7/2015 | Vannithamby et al. |
| 2015/0215981 A1 | 7/2015 | Patil et al. |
| 2015/0305077 A1 | 10/2015 | Johnsson et al. |
| 2015/0334157 A1 | 11/2015 | Oyman et al. |
| 2016/0007216 A1 | 1/2016 | Chou et al. |
| 2016/0094975 A1 | 3/2016 | Sheng |
| 2016/0100384 A1 | 4/2016 | Etemad et al. |
| 2016/0100441 A1 | 4/2016 | Li |
| 2016/0165411 A1 | 6/2016 | Lee et al. |
| 2016/0165414 A1 | 6/2016 | Lee et al. |
| 2016/0165561 A1 | 6/2016 | Lee et al. |
| 2016/0165658 A1 | 6/2016 | Lee et al. |
| 2016/0174276 A1 | 6/2016 | Lee et al. |
| 2016/0174284 A1 | 6/2016 | Lee et al. |
| 2016/0183239 A1 | 6/2016 | Lee et al. |
| 2016/0183241 A1 | 6/2016 | Lee et al. |
| 2016/0192408 A1 | 6/2016 | Martinez Tarradell et al. |
| 2016/0286374 A1* | 9/2016 | Baghel ................. H04W 76/14 |
| 2016/0309284 A1 | 10/2016 | Lee et al. |
| 2017/0006653 A1 | 1/2017 | Zeng et al. |
| 2017/0070900 A1 | 3/2017 | Chou et al. |
| 2017/0094025 A1 | 3/2017 | Gupta |
| 2017/0111898 A1 | 4/2017 | Han et al. |
| 2017/0201933 A1* | 7/2017 | Krishnamoorthy ... H04W 76/14 |
| 2017/0245248 A1* | 8/2017 | Lei ..................... H04W 72/044 |
| 2017/0285105 A1 | 10/2017 | Uemura et al. |
| 2017/0303240 A1 | 10/2017 | Basu Mallick et al. |
| 2018/0007572 A1 | 1/2018 | Chou et al. |
| 2018/0041889 A1* | 2/2018 | Chen .................... H04W 40/02 |
| 2018/0234866 A1 | 8/2018 | Johnsson et al. |

FOREIGN PATENT DOCUMENTS

| | | |
|---|---|---|
| CN | 105101430 A | 11/2015 |
| CN | 105409318 A | 3/2016 |
| CN | 105474684 A | 4/2016 |
| CN | 105554689 A | 5/2016 |
| JP | 2009296546 A | 12/2009 |
| JP | 2015012591 A | 1/2015 |
| JP | 2016509426 A | 3/2016 |
| WO | 2015106684 A1 | 7/2015 |
| WO | 2015116421 A1 | 8/2015 |
| WO | 2015139592 A1 | 9/2015 |
| WO | 2015143170 A1 | 9/2015 |
| WO | 2015157991 A1 | 10/2015 |
| WO | 2016021010 A1 | 2/2016 |
| WO | 2016045094 A1 | 3/2016 |
| WO | 2016047261 A1 | 3/2016 |

OTHER PUBLICATIONS

Written Opinion of the International Search Authority in international application No. PCT/CN2016/081715, dated Jan. 25, 2017.

Li Zexian et al: "Overview on initial METIS D2D concept", 1st International Conference on 5G for Ubiquitous Connectivity, ICST, Nov. 26, 2014 (Nov. 26, 2014), pp. 203-208, XP032735035, DOI: 10.4108/ICST.5GU.2014.258096 [retrieved on Feb. 11, 2015]* the whole document * .

Partial Supplementary European Search Report in the European application No. 16901262.2, dated Jan. 30, 2019.

English translation of the Written Opinion of the International Search Authority in the international application No. PCT/CN2016/081715, dated Jan. 25, 2017.

Supplementary European Search Report in the European application No. 16901262.2, dated Apr. 25, 2019.

First Office Action of the Japanese application No. 2018-550348, dated Jan. 28, 2020.

First Office Action of the Chinese application No. 201680082717.2, dated May 20, 2020.

Office Action of the Indian application No. 201817037749, dated May 13, 2020.

Notice of Rejection of the Japanese application No. 2018-550348, dated Oct. 2, 2020.

Second Office Action of the Chinese application No. 201680082717.2, dated Dec. 3, 2020.

* cited by examiner

100

```
┌─────────────────────────────────────────────────────────────┐
│ A terminal device determines that communication for a first│      110
│ service presently implemented based on a Uu interface fails│  ╱
│ to meet a communication requirement of the first service, │
│ or, the terminal device determines that a radio link       │
│ failure occurs when communication for the first service is │
│ presently implemented based on the Uu interface            │
└─────────────────────────────────────────────────────────────┘
                            │                                  120
┌─────────────────────────────────────────────────────────────┐  ╱
│ The terminal device performs communication for the first   │
│ service in a D2D communication manner                      │
└─────────────────────────────────────────────────────────────┘
```

```
┌─────────────────────────────────────────────────────────────┐
│ A network device determines that D2D communication is      │     210
│ required to be performed for a first service, wherein      │  ╱
│ present communication for the first service is implemented │
│ based on a Uu interface                                    │
└─────────────────────────────────────────────────────────────┘
                            │
┌─────────────────────────────────────────────────────────────┐
│ The network device sends indication information to a       │
│ terminal device, wherein the indication information is     │     220
│ configured to indicate communication for the first service │  ╱
│ to be switched from a Uu-interface-based communication     │
│ manner to a D2D communication manner                       │
└─────────────────────────────────────────────────────────────┘
                            │
┌─────────────────────────────────────────────────────────────┐     230
│ The terminal device receives the indication information    │  ╱
│ sent by the network device                                 │
└─────────────────────────────────────────────────────────────┘
                            │
┌─────────────────────────────────────────────────────────────┐     240
│ The terminal device performs communication for the first   │  ╱
│ service in the D2D communication manner                    │
└─────────────────────────────────────────────────────────────┘
```

COMMUNICATION METHOD, TERMINAL DEVICE AND NETWORK DEVICE

CROSS-REFERENCE TO RELATED APPLICATION

The present application is the U.S. national phase of PCT Application PCT/CN2016/081715 filed on May 11, 2016, entitled "COMMUNICATION METHOD, TERMINAL DEVICE AND NETWORK DEVICE", the disclosure of which is hereby incorporated by reference in its entirety.

TECHNICAL FIELD

The disclosure relates to the field of communication, and more particularly to a communication method, a terminal device and a network device.

BACKGROUND

In a present communication process for the cellular network, communication may be implemented through a Uu interface, that is, communication between terminal devices is implemented through a terminal of a base station. However, such a communication manner is relatively long in delay and poor in communication quality, and a user experience is relatively poor.

SUMMARY

Embodiments of the disclosure provide a communication method, a terminal device, a network device and a storage medium, which may reduce a delay and improve communication quality.

A first aspect provides a communication method, which may include the following operations.

A terminal device determines that communication for a first service presently implemented based on a Uu interface fails to meet a communication requirement of the first service, or, the terminal device determines that a radio link failure occurs when communication for the first service is presently implemented based on the Uu interface.

The terminal device performs communication for the first service in a Device to Device (D2D)) communication manner.

In combination with the first aspect, in a first possible implementation mode of the first aspect, the operation that the terminal device determines that communication for the first service presently implemented based on the Uu interface fails to meet the communication requirement of the first service may include the following action.

The terminal device determines that a delay of communication for the first service implemented based on the Uu interface fails to meet a Quality of Service (QoS) requirement of the first service.

In combination with the first aspect or any abovementioned possible implementation mode, in a second possible implementation mode of the first aspect, the operation that the terminal device performs communication for the first service in the D2D communication manner may include the following actions.

The terminal device monitors whether a resource pool for D2D communication comprises an idle resource.

When the idle resource exists, the idle resource is adopted to perform communication for the first service.

In combination with the first aspect or any abovementioned possible implementation mode, in a third possible implementation mode of the first aspect, before the operation that the terminal device monitors whether the resource pool for D2D communication comprises the idle resource, the method may further include the following action.

Information of the resource pool is determined through a downlink broadcast channel sent by a network device.

In combination with the first aspect or any abovementioned implementation mode, in a fourth possible implementation mode of the first aspect, responsive to determining by the terminal device that communication for the first service presently implemented based on the Uu interface fails to meet the communication requirement of the first service the method may further include the following actions.

The terminal device sends a first message to the network device, the first message being configured to indicate that communication implemented for the first service based on the Uu interface fails to meet the communication requirement of the first service.

The terminal device receives a second message sent by the network device, the second message being configured to indicate a resource configured for the terminal device to perform communication for the first service in a D2D mode.

The operation that the terminal device performs communication for the first service in the D2D communication manner may include that: the terminal device adopts the resource configured for the terminal device by the network device to perform communication for the first service in the D2D communication manner.

In combination with the first aspect or any abovementioned possible implementation mode, in a fifth possible implementation mode of the first aspect, the operation that the terminal device performs communication for the first service in the D2D communication manner may include the following action.

When the terminal device receives the second message after adopting the idle resource in the resource pool for D2D communication to perform communication for the first service, the terminal device stops performing communication for the first service by adopting the idle resource and adopts the resource configured for the terminal device by the network device to perform communication for the first service in the D2D communication manner.

In combination with the first aspect or any abovementioned possible implementation mode, in a sixth possible implementation mode of the first aspect, the operation that the terminal device performs communication for the first service in the D2D communication manner may include the following actions.

When the second message is not received within a first timer, the idle resource in the resource pool for D2D communication is adopted to perform communication for the first service.

When the second message is received within a second timer started after the first timer expires, the terminal device stops performing communication for the first service by adopting the idle resource and adopts the resource configured for the terminal device by the network device to perform communication for the first service in the D2D communication manner.

In combination with the first aspect or any abovementioned possible implementation mode, in a seventh possible implementation mode of the first aspect, before the operation that the terminal device receives the second message sent by the network device, the method may further include the following actions.

The terminal device receives a scrambling sequence number sent by the network device.

The terminal device reports an amount of data to be sent to the network device.

The operation that the terminal device receives the second message sent by the network device may include that: the second message sent by the network device according to the amount of data is received by use of the scrambling sequence number.

In combination with the first aspect or any abovementioned possible implementation mode, in an eighth possible implementation mode of the first aspect, the operation that the terminal device performs communication for the first service in the D2D communication manner may include the following action.

Communication for the first service is performed in the D2D communication manner by adopting a preconfigured resource, wherein the preconfigured resource may be configured for the terminal device by the network device.

A second aspect provides a communication method, which may include the following operations.

A terminal device receives indication information sent by a network device, wherein the indication information is configured to indicate communication for a first service to be switched from a Uu-interface-based communication manner to a D2D communication manner.

The terminal device performs communication for the first service in the D2D communication manner.

In combination with the second aspect, in a first possible implementation mode of the second aspect, the operation that the terminal device performs communication for the first service in the D2D communication manner may include the following actions.

The terminal device monitors whether a resource pool for D2D communication comprises an idle resource.

When the idle resource exists, the idle resource is adopted to perform communication for the first service.

In combination with the second aspect or any abovementioned possible implementation mode thereof, in a second possible implementation mode of the second aspect, the indication information may further include a resource for D2D communication.

The operation that the terminal device performs communication for the first service in the D2D communication manner may include the following action.

The terminal device performs communication for the first service in the D2D communication manner by adopting the resource indicated by the indication information.

In combination with the second aspect or any abovementioned possible implementation mode thereof, in a third possible implementation mode of the second aspect, before the operation that the terminal device receives the indication information sent by the network device, the method may further include the following action.

The terminal device sends a notification message to the network device, wherein the notification message may be configured to indicate a delay of communication for the first service implemented based on a Uu interface or whether the delay meets a QoS requirement.

In combination with the second aspect or any abovementioned possible implementation mode thereof, in a fourth possible implementation mode of the second aspect, the notification message may further be configured to indicate a delay of communication for another service implemented based on the Uu interface or whether the delay meets the QoS requirement.

A third aspect provides a communication method, which may include the following operations.

A network device determines that D2D communication is required to be performed for a first service, wherein present communication for the first service is implemented based on a Uu interface.

Indication information is sent to a terminal device, wherein the indication information is configured to indicate communication for the first service to be switched from a Uu-interface-based communication manner to a D2D communication manner.

In combination with the third aspect, in a first possible implementation mode of the third aspect, the indication information may further include a resource for D2D communication.

In combination with the third aspect or the first possible implementation mode thereof, in a second possible implementation mode of the third aspect, the method may further include the following actions.

Communication quality or communication delays of multiple services are received from the terminal device, wherein the multiple services may include the first service.

It is determined that D2D communication is required to be performed for the first service according to the present communication quality or communication delays of the multiple services.

A fourth aspect provides a communication method, which may include the following operations.

A terminal device determines an amount of data to be sent in a present D2D communication manner.

The terminal device reports the amount of data to network device.

When a resource allocation message sent by the network device is received, D2D communication for the data to be sent is performed through a resource indicated by the resource allocation message, wherein the resource allocation message is configured to indicate resources allocated for performing D2D communication for the data to be sent.

When the resource allocation message is not received, D2D communication is performed through an idle resource in a resource pool, wherein the resource pool may include a resource available for D2D communication.

In combination with the fourth aspect, in a first possible implementation mode of the fourth aspect, the operation that the D2D communication is performed through the idle resource in the resource pool may include that: when the resource allocation message is not received until a first timer expires, the idle resource in the resource pool is adopted to perform D2D communication.

The operation that the D2D communication for the data to be sent is performed through the resource indicated by the resource allocation message may include the following action.

When the resource allocation message allocated by the network device is received within a second timer started after the first timer expires, the terminal device stops performing communication for the first service by adopting the idle resource and adopts the resource indicated by the resource allocation message to perform communication for the first service in the D2D communication manner.

In combination with the fourth aspect or the first possible implementation mode thereof, in a second possible implementation mode of the fourth aspect, the method may further include the following actions.

The terminal device receives a scrambling sequence number sent by the network device.

The resource allocation message sent by the network device according to the amount of data is received by use of the scrambling sequence number.

A fifth aspect provides a terminal device, which is configured to perform the method in the first aspect or any possible implementation mode of the first aspect. Specifically, the terminal device includes units configured to perform the method in the first aspect or any possible implementation mode of the first aspect.

A sixth aspect provides a terminal device, which is configured to perform the method in the second aspect or any possible implementation mode of the second aspect. Specifically, the terminal device includes units configured to perform the method in the second aspect or any possible implementation mode of the second aspect.

A seventh aspect provides a network device, which is configured to perform the method in the third aspect or any possible implementation mode of the third aspect. Specifically, the network device includes units configured to perform the method in the third aspect or any possible implementation mode of the third aspect.

An eighth aspect provides a terminal device, which is configured to perform the method in the fourth aspect or any possible implementation mode of the fourth aspect. Specifically, the terminal device includes units configured to perform the method in the fourth aspect or any possible implementation mode of the fourth aspect.

A ninth aspect provides a terminal device, which includes a memory and a processor. The memory is configured to store an instruction. The processor is configured to perform the instruction stored in the memory, and when the processor performs the instruction stored in the memory, such execution enables the processor to perform the method in the first aspect or any possible implementation mode of the first aspect.

A tenth aspect provides a terminal device, which includes a memory and a processor. The memory is configured to store an instruction. The processor is configured to perform the instruction stored in the memory, and when the processor performs the instruction stored in the memory, such execution enables the processor to perform the method in the second aspect or any possible implementation mode of the second aspect.

An eleventh aspect provides a network device, which includes a memory and a processor. The memory is configured to store an instruction. The processor is configured to perform the instruction stored in the memory, and when the processor performs the instruction stored in the memory, such execution enables the processor to perform the method in the third aspect or any possible implementation mode of the third aspect.

A twelfth aspect provides a terminal device, which includes a memory and a processor. The memory is configured to store an instruction. The processor is configured to perform the instruction stored in the memory, and when the processor performs the instruction stored in the memory, such execution enables the processor to perform the method in the fourth aspect or any possible implementation mode of the fourth aspect.

A thirteenth aspect provides a computer storage medium, having stored a program code. The program code may be configured to instruct the method in the first aspect or any possible implementation mode of the first aspect to be performed.

A fourteenth aspect provides a computer storage medium, having stored a program code. The program code may be configured to instruct the method in the second aspect or any possible implementation mode of the second aspect to be performed.

A fifteenth aspect provides a computer storage medium, having stored a program code. The program code may be configured to instruct the method in the third aspect or any possible implementation mode of the third aspect to be performed.

A sixteenth aspect provides a computer storage medium, having stored a program code. The program code may be configured to instruct the method in the fourth aspect or any possible implementation mode of the fourth aspect to be performed.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS) and 5th-Generation (5G).

In some embodiments, Device to Device (D2D) communication may refer to Vehicle to Vehicle (V2V) communication or Vehicle to X (V2X) communication. In V2X communication, X may generally refer to any equipment with a wireless receiving and sending capability, for example, but not limited to, a wireless device moving at a low speed, vehicle-mounted equipment moving at a high speed or a network control node with a wireless transmitting and receiving capability. Of course, the embodiments of the disclosure may be not applied D2D communication but communication between a terminal and a cellular network.

In the embodiments of the disclosure, a terminal device may also be called an access terminal, a user unit, a user station, a mobile radio station, a mobile station, a remote station, a remote terminal, a mobile device, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, a computing device, other processing device connected to a wireless modem, vehicle-mounted equipment, wearable equipment and a terminal device in a future 5G network. A network device may be configured to communicate with a mobile device, and the network device may be a Base Transceiver Station (BTS) in the GSM or CDMA, may also be a NodeB (NB) in WCDMA, and may further be an Evolutional Node B (eNB or eNodeB) in LTE, or a relay station or an access point, or vehicle-mounted equipment, wearable equipment and a network device in the future 5G network.

In the embodiments of the disclosure, a communication interface between the terminal and the network device may be called a Uu interface, and a D2D interface between terminal devices may be called a PC5 interface.

For convenient understanding, a delay acquisition method mentioned in the embodiments of the disclosure will be described below in detail.

In the operation A, a sender adds time indication information into a sent packet, wherein the time indication information is configured for a receiver to acquire a delay from the sender to the receiver.

In at least one embodiment, the sent packet is a Packet Data Convergence Protocol (PDCP) packet, a Radio Link Control (RLC) packet or a Media Access Control (MAC) packet.

In at least one embodiment, the sent packet is a data packet or a dedicated delay probing packet.

In the operation B, the sender sends the sent packet to the receiver.

In at least one embodiment, the sender determines Quality of Service (QoS) of a service corresponding to the delay from the sender to the receiver to be acquired, and the sender sends the sent packet to the receiver according to the corresponding QoS.

In the operation C, the receiver receives the sent packet from the sender, wherein the sent packet includes the time indication information.

In the example, the receiver parses the time indication information in the same layer where the sender adds the time indication information. For example, when the sender adds the time indication information in a MAC layer, the receiver parses the time indication information in the MAC layer.

In the operation D, the receiver determines the delay from the sender to the receiver according to the time indication information.

In at least one embodiment of the disclosure, the sender may send the sent packet through multiple paths, and the receiver receives the sent packet sent by the sender through the multiple paths and determines a delay of each delay in the multiple paths. In the example, path information of the corresponding paths may be included in the sent packet, or, an intermediate node through which the sent packet passes adds the path information of the paths into the packet.

In at least one embodiment of the disclosure, the time indication information included in the sent packet sent by the sender may include a starting time point of processing the sent packet by the sender, and the receiver may determine the delay from the sender to the receiver according to a difference between an ending time point of processing the sent packet and the starting time point. In the example, the starting time point of processing the sent packet by the sender refers to a time point when the packet is obtained or a time point when the packet is started to be generated, and the ending time point of processing the sent packet by the receiver may refer to a time point when parsing of the packet is completed.

In at least one embodiment, the starting time point and the ending time point may be absolute time, for example, absolute time corresponding to Coordinated Universal Time (UTC), Beidou and a Global Positioning System (GPS), and then the difference between the ending time point and the starting time point may directly be determined as the delay from the sender to the receiver.

The starting time point and the ending time point may not be absolute time, and for example, may be time defined by a communication system, for example, time represented by a subframe or a time slot. Then, it is necessary to determine the delay from the sender to the receiver according to a synchronization time offset of the sender and the receiver and according to the difference between the ending time point and the starting time point.

In the example, the synchronization time offset of the sender and the receiver may be calculated according to a synchronization time offset between any two nodes from the sender to the receiver. When a previous node of the intermediate node is out of synchronism with the intermediate node, the node may determine a synchronization time offset with the previous node and record the synchronization time offset in the sent packet.

For example, a node 1 and a node 2 exist between the sender and the receiver. The node 1, after receiving the sent packet, may acquire a synchronization time offset between the sender and the node 1 and record it in the sent packet; and the node 2, after receiving the sent packet, may acquire a synchronization time offset between the node 1 and the node 2 and record it in the sent packet. In the example, the synchronization time offset between the node 1 and the node 2 may be accumulated with a previous synchronization time offset for recording in the sent packet, that is, the synchronization time offset between the node 1 and the node 2 is added to the previous synchronization time offset and the recorded synchronization time offset is changed into the added synchronization time offset. In an alternative example, the synchronization time offset between the node 1 and the node 2 may be independently recorded in an information field. The receiver, after receiving the sent packet, may acquire a synchronization time offset between the node 2 and the receiver and acquire a synchronization time offset between the sender and the node 2 according to records in the sent packet, thereby acquiring the synchronization time offset between the sender and the receiver.

In at least one embodiment, the sender may add a processing delay of processing the sent packet into the sent packet, and the intermediate node, after receiving the sent packet, may add a processing delay and a transmission delay with the previous node into the sent packet. The intermediate node may independently record the processing delay and the transmission delay in different information fields in the sent packet: or, the intermediate node may record a sum of the processing delay and transmission delay obtained by the intermediate node in an information field, but does not accumulate with time recorded by another node; or, the intermediate node may accumulate the processing delay with a processing delay obtained by the other node for recording in an information field and record the transmission delay and a transmission delay obtained by the other node in another information field; or, the intermediate node accumulates the sum of the transmission delay and the processing delay with a sum of the processing delay and transmission delay recorded in the sent packet and updates the records. After receiving the sent packet, the sender may obtain the delay between the sender and the receiver according to an indication of the time indication information in the sent packet.

For convenient understanding, some recording manners for the time indication information will be described below with some implementation modes as examples.

In an implementation mode, the time indication information includes the processing delay of processing the sent packet by the sender, includes a processing delay of processing the sent packet by any intermediate node between the sender and the receiver and includes a transmission delay between the intermediate node and the previous node of the intermediate node, the transmission delay being acquired by the any intermediate node. In the example, processing delays of processing the sent packet by different nodes are carried in different information fields of the sent packet, transmission delays acquired by different nodes are carried in different information fields of the sent packet, and the processing delay and transmission delay of the same node are carried in different information fields of the sent packet. Under this condition, the receiver determines a processing delay of processing the sent packet by the receiver and a transmission delay between the receiver and a previous node of the receiver. The delay from the sender to the receiver is determined according to a sum of the processing delay of processing the sent packet by the sender, the processing delay of processing the sent packet by any intermediate node, the transmission delay between the intermediate node and the previous node of the intermediate node that is acquired by the intermediate node, the processing delay of processing the sent packet by the receiver and the transmission delay between the receiver and the previous node of the receiver.

For example, the node 1 and the node 2 exist between the sender and the receiver, the processing delay (for example, 1 ms) of processing the sent packet by the sender is recorded in an information field. The node 1 receives the sent packet, acquires the transmission delay of 0.5 ms from the receiver to the node 1, acquires the processing delay of 1 ms of processing the sent packet, and records 0.5 ms and 1 ms in different information fields, respectively. The node 2 receives the sent packet, acquires the transmission delay of 0.6 ms from the node 1 to the node 2, acquires the processing delay of 1.1 ms of processing the sent packet, and records 0.6 ms and 1.1 ms in different information fields, respectively. The receiver receives the sent packet, acquires the transmission delay of 0.4 ms from the node 2 to the receiver and the processing delay of 1.2 ms of processing the sent packet, acquires 1 ms, 1 ms, 0.5 ms, 0.6 ms and 1.1 ms recorded in the sent packet, and adds 1 ms, 1 ms, 0.5 ms, 0.6 ms, 1.1 ms, 0.4 ms and 1.2 ms to obtain a time value for determining the delay from the sender to the receiver.

In an implementation mode, the time indication information includes the processing delay of processing the sent packet by the sender and includes a sum of the processing delay of processing the sent packet by any intermediate node between the sender and the receiver and the transmission delay between the intermediate node and a previous node of the intermediate node, wherein sums of the processing delays of processing the sent packet by different nodes and the acquired transmission delays are carried in different information fields of the sent packet. Under this condition, the receiver determines the processing delay of processing the sent packet by the receiver and the transmission delay between the receiver and the previous node of the receiver. The delay from the sender to the receiver is determined according to a sum of the processing delay of processing the sent packet by the sender, the sum of the processing delay of processing the sent packet by the intermediate node between the sender and the receiver and the acquired transmission delay between the intermediate node and the previous node of the intermediate node, the processing delay of processing the sent packet by the receiver and the transmission delay between the receiver and the previous node of the receiver.

For example, the node 1 and the node 2 exist between the sender and the receiver. The processing delay (for example, 1 ms) of processing the sent packet by the sender is recorded in an information field, and the node 1 receives the sent packet, acquires the transmission delay of 0.5 ms from the receiver to the node 1, acquires the processing delay of 1 ms of processing the sent packet and records 1.5 ms in the information field. The node 2 receives the sent packet, acquires the transmission delay of 0.6 ms from the node 1 to the node 2, acquires the processing delay of 1.1 ms of processing the sent packet and records 1.7 ms in an information field that is different from the sender. The receiver receives the sent packet, acquires the transmission delay of 0.4 ms from the node 2 to the receiver and the processing delay of 1.2 ms of processing the sent packet, acquires 1 ms, 1.5 ms and 1.7 ms recorded in the sent packet and adds 1 ms, 1.5 ms, 1.7 ms, 0.4 ms and 1.2 ms to obtain a time value for determining the delay from the sender to the receiver.

In an implementation mode, the time indication information includes a sum of the processing delay of processing the sent packet by the sender, the processing delay of processing the sent packet by an intermediate node between the sender and the receiver and the transmission delay between the intermediate node and a previous node of the intermediate node. The receiver determines the processing delay of processing the sent packet by the receiver and the transmission delay between the previous node of the receiver and the receiver. The delay from the sender to the receiver is determined according to a sum of the processing delay of processing the sent packet by the receiver, the transmission delay between the previous node of the receiver and the receiver and the sum of the processing delay of processing the sent packet by the sender, the processing delay of processing the sent packet by the intermediate node between the sender and the receiver and the transmission delay between the intermediate node and the previous node of the intermediate node.

For example, the node 1 and the node 2 exist between the sender and the receiver. The processing delay (for example, 1 ms) of processing the sent packet by the sender is recorded in an information field, and the node 1 receives the sent packet, acquires the transmission delay of 0.5 ms from the receiver to the node 1, acquires the processing delay of 1 ms of processing the sent packet and updates 1 ms recorded by the sender into 2.5 ms. The node 2 receives the sent packet, acquires the transmission delay of 0.6 ms from the node 1 to the node 2, acquires the processing delay of 1.1 ms of processing the sent packet and updates 2.5 ms recorded by the node 1 into 4.2 ms. The receiver receives the sent packet, acquires the transmission delay of 0.4 ms from the node 2 to the receiver and the processing delay of 1.2 ms of processing the sent packet, acquires 14.2 recorded in the sent packet and adds 4.2 ms, 0.4 ms and 1.2 ms to obtain a time value for determining the delay from the sender to the receiver.

When at least one of the processing delay or transmission delay acquired by each node is not obtained through absolute time, it is also necessary to acquire the synchronization time offset of the sender and the receiver, wherein the synchronization time offset of the sender and the receiver may be calculated according to the synchronization time offset between any two nodes from the sender to the receiver. When the previous node of the intermediate node is asynchronous with the intermediate node, the node may determine the synchronization time offset with the previous node and record the synchronization time offset in the sent packet.

In the example, when recording the synchronization time offset, recorded in the sent packet, with the previous node, each node may independently record it and may also record it in combination with at least one of the processing delay or the transmission delay.

In at least one embodiment, the sent packet further includes at least one of a delay requirement, a receiver list or a feedback object.

In the example, when the sent packet includes the delay requirement, the receiver may determine whether the delay meets the delay requirement and feed back to the feedback object whether the delay from the sender to the receiver meets the delay requirement.

In the example, when the sent packet does not include the delay requirement, the receiver may directly feed back the delay from the sender to the receiver to the feedback object. In an alternative example, according to the delay requirement acquired in another manner (for example, a delay requirement configured a by network device), the receiver may determine whether the delay meets the delay requirement and feed back to the feedback object whether the delay from the sender to the receiver meets the delay requirement.

In the example, the feedback object of the delay may be the sender and may also be a third-party entity, for example, the network device.

In at least one embodiment, the sender receives configuration information sent by the third-party entity. The configuration information is configured to instruct the sender to send the sent packet including the time indication information to the receiver.

In at least one embodiment, the sender sends the sent packet to the receiver through a Uu interface or a D2D interface.

Therefore, in the embodiments of the disclosure, the time indication information is added into the sent packet, such that the delay from the sender to the receiver is accurately acquired.

Figure 1:
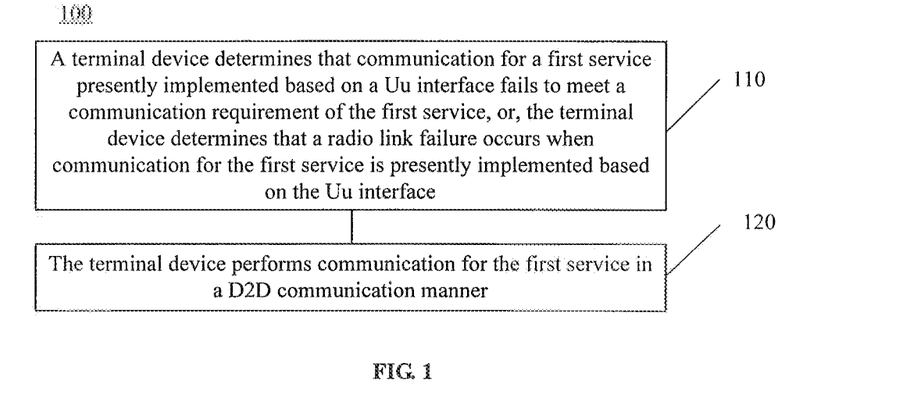
FIG. 1 is a schematic flowchart of a communication method according to an embodiment.

FIG. 1 is a schematic flowchart of a communication method 100 according to an embodiment of the disclosure. As illustrated in FIG. 1, the method 100 includes the operations at blocks 110 and 120.

In 110, a terminal device determines that communication for a first service presently implemented based on a Uu interface fails to meet a communication requirement of the first service, or, the terminal device determines that a radio link failure occurs when communication for the first service is presently implemented based on the Uu interface.

In at least one embodiment, that communication for a service implemented based on the Uu interface fails to meet a communication requirement of the service may be that a delay of communication implemented for the service based on the Uu interface fails to meet a QoS requirement of the service.

In 120, the terminal device performs communication for the first service in the D2D communication manner.

In at least one embodiment, after the terminal device determines that communication for the first service presently implemented based on the Uu interface fails to meet the communication requirement of the first service, or, after it is determined that the radio link failures occurs during communication for the first service presently implemented based on the Uu interface, the terminal device determines an idle resource in a resource pool for D2D communication and adopts the idle resource to perform communication for the first service.

In the example, the terminal device may keep monitoring the idle resource in the resource pool. Once determining that the first service is required to be switched to a D2D communication mode, the terminal device may directly adopt the monitored idle resource to perform D2D communication for the first service. In an alternative example, the terminal device may monitor the idle resource and adopt the monitored idle resource to perform D2D communication only when determining that the first service is required to be switched to the D2D communication mode. In at least one embodiment, after the idle resource is adopted to perform D2D communication for the first service, a notification message may be sent to a network device to report that the first service has been switched to the D2D communication mode by use of the idle resource.

In the example, the terminal device may determine information of the resource pool through a downlink broadcast channel sent by the network device.

In at least one embodiment, responsive to determining by the terminal device that communication for the first service presently implemented based on the Uu interface fails to meet the communication requirement of the first service, the terminal device sends a first message to the network device, wherein the first message is configured to indicate that communication for the first service implemented based on the Uu interface fails to meet the communication requirement of the first service. The terminal device receives a second message sent by the network device, wherein the second message is configured to indicate a resource configured for the terminal device to perform communication for the first service in the D2D mode. The terminal device adopts the resource configured for the terminal device by the network device to perform communication for the first service in the D2D communication manner.

In the example, the first message may directly indicate that communication or the first service presently implemented based on the Uu interface fails to meet the communication requirement of the first service. For example, information corresponding to "meet" or "not meet" may be directly included in the first message. For example, 0 represents meet, and 1 represents not meet.

In an alternative example, the first message may indirectly indicate that communication for the first service presently implemented based on the Uu interface fails to meet the communication requirement of the first service. For example, a Uu-interface-based communication delay and a corresponding QoS requirement may be included in the first message. Of course, a result about whether the delay meets QoS may be included, and the delay and the corresponding QoS requirement may both be included.

In the example, the terminal device, after sending the first message, may directly monitor the idle resource in the resource pool, and when the idle resource is monitored, the idle resource may be adopted for communication. In an alternative example, the terminal device may also not perform monitoring of the idle resource in the resource pool after sending the first message, wait for the second message and, after receiving the second message, perform D2D communication for the first service according to the resource allocated in the second message.

In at least one embodiment, when the terminal device receives the second message after adopting the idle resource in the resource pool to perform communication for the first service, the terminal device stops performing communication for the first service by adopting the idle resource and adopts the resource configured for the terminal device by the network device to perform communication for the first service in the D2D communication manner.

In at least one embodiment, the terminal device may start a first timer after sending the first message and. When the second message is not received within the first timer, the terminal device may adopt the idle resource in the resource pool for D2D communication to perform communication for the first service. The terminal device may also start a second timer after the first timer expires. When the second message is received within the second timer, the terminal device stops performing communication for the first service by adopting the idle resource and adopts the resource configured for the terminal device by the network device to perform communication for the first service in the D2D communication manner.

In the embodiments of the disclosure, the terminal device may also not start the second timer after the first timer expires, but directly monitors the idle resource in the resource pool. After monitoring the idle resource, the terminal device adopts the idle resource to perform D2D communication for the first service.

In at least one embodiment, the terminal device receives a scrambling sequence number (which may specifically be a Radio Network Temporary Identity (RNTI)) sent by the network device, and the terminal device reports an amount of data to be sent to the network device. By virtue of the scrambling sequence number, the terminal device receives the second message that is sent by the network device according to the amount of data, and adopts the resource in the second message to perform D2D communication for the first service. The RNTI mentioned herein may be a sidelink-RNTI (SL-RNTI).

Specifically, after a base station receives a message indicating that communication for a service fails to meet a communication requirement from the terminal, the base station allocates an SL-RNTI to a terminal at first. The terminal may report an amount of data to be sent to the base station through a Buffer Status Report (RSR) when new data arrives, and then the terminal listens to a D2D_grant (wherein D2D_ is scheduling information of a resource allocated to the terminal) allocated by the base station on a Physical Downlink Control Channel (PDCCH) based on the SL-RNTI. When the terminal does not detect the D2D_grant sent by the base station within a first timer (which may be caused by a detection error of the terminal), the terminal may adopt an idle resource of a resource pool for sending. When the terminal receives the D2D_grant within a second timer started after the first timer expires, the terminal may ignore the scheduling information and continue adopting the idle resource in the resource pool for D2D communication; or the terminal may also adopt a resource indicated in the scheduling information for D2D communication.

In the example, when the second message is received within the first timer or the second timer, the scrambling sequence number may also be adopted to monitor the D2D_grant sent by the base station.

In at least one embodiment, the network device adopts the resource pre-configured for the first service by the network device to perform communication for the first service in the D2D communication manner.

In the example, when the first service has a very high priority or QoS service requirement, that is, a service switching delay is not allowed to be excessively long, the network device may pre-configure the resource for the first service of the terminal device. When the terminal device determines that a delay of communication for the first service fails to meet a communication quality requirement or the radio link failure occurs, D2D communication for the first service may be performed.

For example, services, under execution on the Uu interface, of the terminal may have very high priorities or QoS requirements, the base station may reserve and configure resources for D2D communication for the services in advance. Once the terminal finds that a delay of a certain service in these services fails to meet the requirement, the terminal may directly switch the service into a PC5 interface communication mode and adopt the pre-allocated resource to perform D2D communication without reporting to the base station in advance. Then, the terminal may report to the base station that communication for the service has been implemented based on the resource pre-configured for the service in the D2D communication manner.

Therefore, in the embodiment of the disclosure, when communication for the first service presently implemented based on the Uu interface fails to meet the communication requirement of the first service, or when the radio link failure occurs when communication for the first service is presently implemented based on the Uu interface, the Uu-interface-based communication manner is switched to the D2D communication manner to perform communication for the first service, so that the delay may be reduced, and communication quality may be improved.

Figure 2:
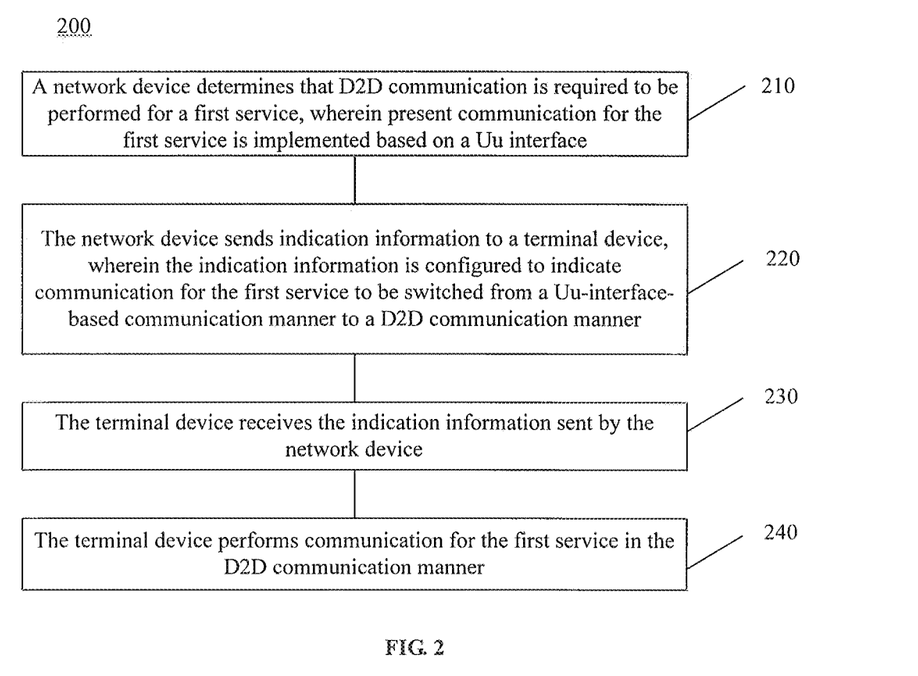
FIG. 2 is a schematic flowchart of a communication method according to an embodiment.

FIG. 2 is a schematic flowchart of a communication method 200 according to an embodiment of the disclosure. As illustrated in FIG. 2, the method includes the operations at blocks 210, 220, 230 and 240.

In 210, a network device determines that D2D communication is required to be performed for a first service, wherein present communication for the first service is implemented based on a Uu interface.

In at least one embodiment, a terminal device, when determining that communication for the first service presently implemented based on the Uu interface fails to meet a communication requirement of the first service (for example, a delay fails to meet a QoS requirement), may send a notification message to the network device, wherein the notification message is configured to indicate a delay of the first service for which communication is implemented based on the Uu interface or whether the delay meets a QoS requirement. Then, according to the notification message, the network device may determine that D2D communication is required by the first service for which communication is presently implemented based on the Uu interface.

In at least one embodiment, the terminal device may send delays of all services presently performed based on the Uu interface or whether the delays meet QoS requirements to the network device, and then the network device may determine all services of which the delays do not meet the requirements as services to be switched into a D2D communication mode. In at least one alternative embodiment, the terminal device may determine part of services of which the delays meet the requirements as services to be switched into the D2D communication mode. For example, when a load of the network device is relatively high, the network device may switch part of services of which the delays are relatively long but still meet the requirements into the D2D communication mode.

In 220, the network device sends indication information to a terminal device, wherein the indication information is configured to indicate communication for the first service to be switched from a Uu-interface-based communication manner to a D2D communication manner.

In 230, the terminal device receives the indication information sent by the network device.

In 240, the terminal device performs communication for the first service in the D2D communication manner.

In at least one embodiment, the indication information does not include a resource allocated for the first service of the terminal, then the terminal may monitor whether an idle resource exists in a resource pool for D2D communication. When the idle resource exists, the terminal may adopt the idle resource to perform D2D communication for the first service.

In an alternative embodiment, the indication information includes the resource configured to perform D2D communication for the first service, and the terminal device adopts the resource indicated by the indication information to perform communication for the first service in the D2D communication manner.

Therefore, in the embodiments of the disclosure, the terminal device may switch the Uu-interface-based communication manner into the D2D communication manner to perform communication for the service according to an indication of the network device, so that a flexible communication manner may be implemented, a delay may be reduced, and communication quality may be improved.

Figure 3:
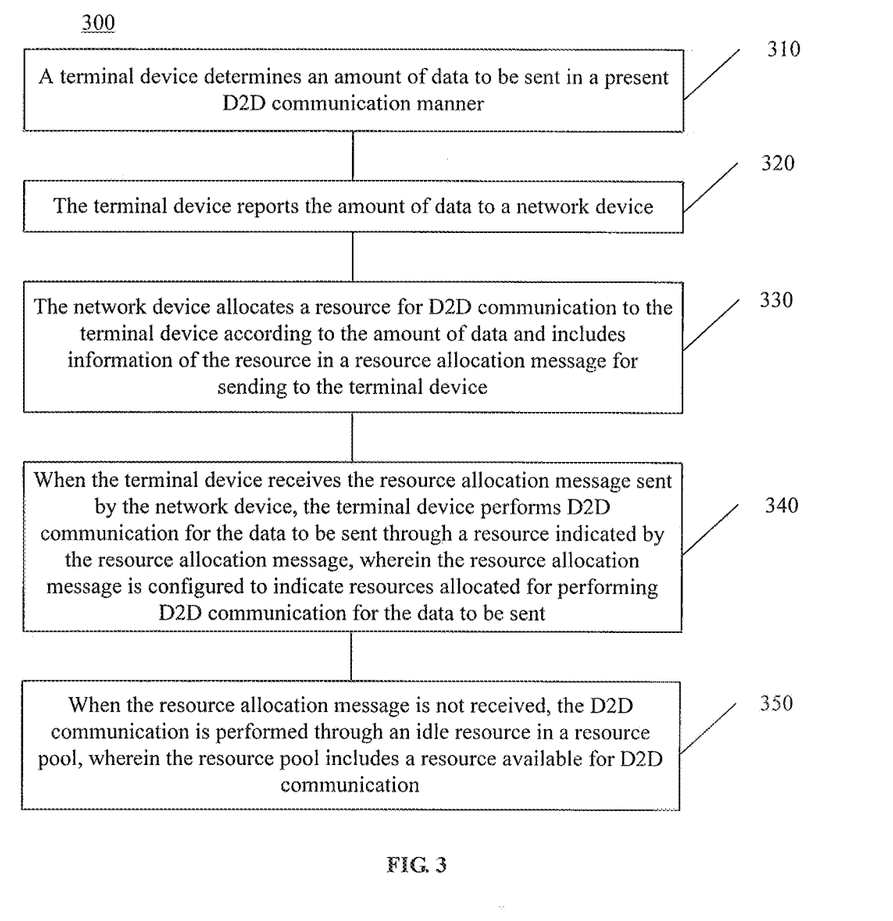
FIG. 3 is a schematic flowchart of a communication method according to an embodiment.

FIG. 3 is a schematic flowchart of a communication method 300 according to an embodiment of the disclosure. As illustrated in FIG. 3, the method includes the operations at blocks 310, 320, 330, 340 and 350.

In 310, a terminal device determines an amount of data to be sent in a present D2D communication manner.

In 320, the terminal device reports the amount of data to a network device.

In 330, the network device allocates a resource for D2D communication to the terminal device according to the amount of data and includes information of the resource in a resource allocation message for sending to the terminal device.

In 340, when the terminal device receives the resource allocation message sent by the network device, the terminal device performs D2D communication for the data to be sent through a resource indicated by the resource allocation message, wherein the resource allocation message is configured to indicate resources allocated for performing D2D communication for the data to be sent.

In 350, when the resource allocation message is not received, the D2D communication is performed through an idle resource in a resource pool, wherein the resource pool includes a resource available for D2D communication.

In at least one embodiment, the terminal device may start a first timer after reporting the amount of data to the network device, and when the resource allocation message is not received within the first timer, the terminal device may adopt the idle resource in the resource pool for D2D communication to send the data to be sent. The terminal device may also start a second timer after the first timer expires, and when the resource allocation message is received within the second timer, the terminal device stops adopting the idle resource and adopts the resource configured for the terminal device by the network device to perform transmission of the data to be sent in the D2D communication manner.

In the embodiment of the disclosure, the terminal device may also not start the second timer after the first timer expires, but directly monitors the idle resource in the resource pool. After monitoring the idle resource, the terminal device adopts the idle resource to send the data to be sent.

In at least one embodiment, the terminal device receives a scrambling sequence number (which may specifically be an SL-RNTI) sent by the network device, and the terminal device reports the amount of data of the data to be sent to the network device. By virtue of the scrambling sequence number, the terminal device receives the resource allocation message sent by the network device according to the amount of data, and sends the data to be sent by adopting the resource in the resource allocation message.

Specifically, a terminal works in a D2D mode, the terminal may report an amount of data to be sent to a base station through a BSR when new data arrives, and then the terminal listens to a D2D_grant (wherein D2D_ is scheduling information of a resource allocated to the terminal) on a PDCCH based on an SL-RNTI (the SL-RNTI may be allocated to the terminal by a network device before the BSR is sent). When the terminal does not detect the D2D_grant sent by the base station within a first timer (which may be caused by a detection error of the terminal), the terminal may adopt an idle resource in a resource pool for sending. When the terminal receives the D2D_grant within a second timer started after the first timer expires, the terminal may ignore the scheduling information and continue adopting the idle resource in the resource pool for D2D communication; or the terminal may also adopt a resource indicated in the scheduling information for D2D communication.

In the example, when the second message is received within the first timer or the second timer, the scrambling sequence number may also be adopted.

Therefore, in the embodiments of the disclosure, under D2D communication, the terminal device reports the amount of the data to be sent to the network device and the network device allocates the resource to the terminal device according to the amount of data to perform transmission of the data to be sent, so that resource waste may be avoided. Further, when the resource allocated by the network device is not allocated, the idle resource in the resource pool is adopted for sending, so that the data may be timely sent, a delay may be reduced, and communication quality may be improved.

Figure 4:
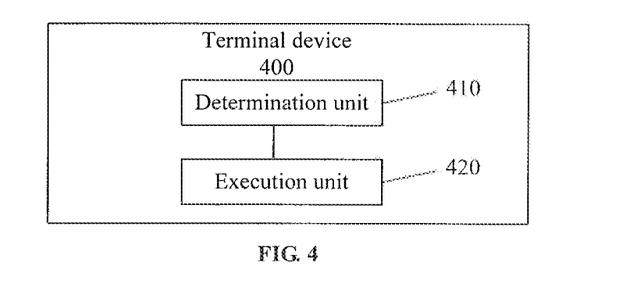
FIG. 4 is a schematic block diagram of a terminal device according to an embodiment.

FIG. 4 is a schematic block diagram of a terminal device 400 according to an embodiment of the disclosure. As illustrated in FIG. 4, the terminal device 400 includes the following units.

A determination unit 410, configured to determine that communication for a first service presently implemented based on a Uu interface fails to meet a communication requirement of the first service, or, determine that a radio link failure occurs when communication for the first service is presently implemented based on the Uu interface.

An execution unit 420, configured to perform communication for the first service in a D2D communication manner.

In at least one embodiment, the determination unit 410 may further be configured to: determine that a delay of communication for the first service implemented based on the Uu interface fails to meet a QoS requirement of the first service.

In at least one embodiment, the execution unit 420 may specifically be configured to: monitor whether a resource pool for D2D communication comprises an idle resource: and when the idle resource exists, perform communication for the first service by adopting the idle resource.

In at least one embodiment, the execution unit 420 may further be configured to: determine information of the resource pool through a downlink broadcast channel sent by a network device.

In at least one embodiment, responsive to determining by the determination unit 410 that communication for the first service presently implemented based on the Uu interface fails to meet the communication requirement of the first service, the execution unit 420 may further be configured to: send a first message to the network device, wherein the first message may be configured to indicate that communication for the first service implemented based on the Uu interface fails to meet the communication requirement of the first service; receive a second message sent by the network device, wherein the second message may be configured to indicate a resource configured for the terminal device to perform communication for the first service in a D2D mode; and adopt the resource pre-configured for the terminal device by the network device to perform communication for the first service in the D2D communication manner.

In at least one embodiment, the execution unit 420 may further be configured to: when the execution unit receives the second message after adopting the idle resource in the resource pool for D2D communication to perform communication for the first service, stop performing communication for the first service by adopting the idle resource and adopt the resource configured for the terminal device by the network device to perform communication for the first service in the D2D communication manner.

In at least one embodiment, the execution unit 420 may further be configured to: when the second message is not received within a first timer, adopt the idle resource in the resource pool for D2D communication to perform communication for the first service; and when the second message is received within a second timer started after the first timer expires, stop performing communication for the first service by adopting the idle resource and adopt the resource configured for the terminal device by the network device to perform communication for the first service in the D2D communication manner.

In at least one embodiment, the execution unit 420 may further be configured to: receive a scrambling sequence number sent by the network device; report an amount of data to be sent to the network device; and receive the second message sent by the network device according to the amount of data by use of the scrambling sequence number.

In at least one embodiment, the execution unit 420 may further be configured to: perform communication for the first service in the D2D communication manner by adopting a preconfigured resource, wherein the preconfigured resource is configured for the terminal device by the network device.

It is to be understood that the terminal device 400 may correspond to a terminal device in the method 100, may realize corresponding functions of the terminal device and will not be elaborated herein for simplicity.

Figure 5:
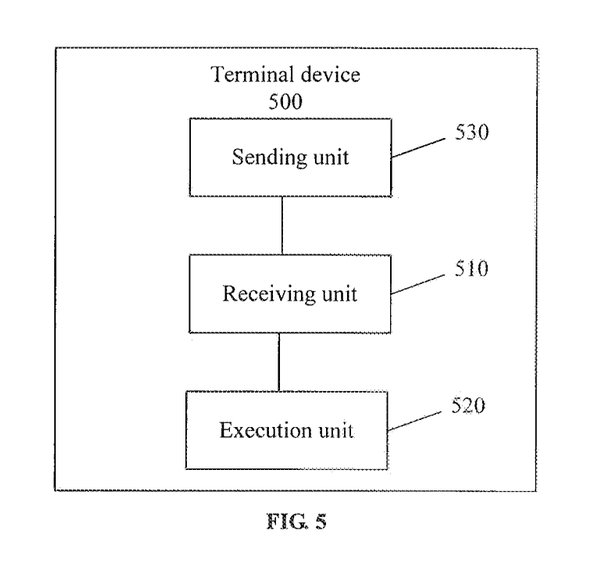
FIG. 5 is a schematic block diagram of a terminal device according to an embodiment.

FIG. 5 is a schematic block diagram of a terminal device 500 according to an embodiment of the disclosure. As illustrated in FIG. 5, the terminal device 500 includes the following units.

A receiving unit 510, configured to receive indication information sent by a network device, wherein the indication information is configured to indicate communication for a first service to be switched from a Uu-interface-based communication manner to a D2D communication manner.

An execution unit 520, configured to perform communication for the first service in the D2D communication manner.

In at least one embodiment, the execution unit 520 may further be configured to: monitor whether a resource pool for D2D communication comprises an idle resource; and when the idle resource exists, adopt the idle resource to perform communication for the first service.

In at least one embodiment, the indication information further includes a resource for D2D communication.

The execution unit 520 may further be configured to: perform communication for the first service in the D2D communication manner by adopting the resource indicated by the indication information.

In at least one embodiment, as illustrated in FIG. 5, the terminal device 500 further includes a sending unit 530.

The sending unit may be configured to, before the receiving unit 510 receives the indication information sent by the network device, send a notification message to the network device, wherein the notification message may be configured to indicate a delay of communication for the first service implemented based on a Uu interface or whether the delay meets a QoS requirement.

In at least one embodiment, the notification message may further be configured to indicate a delay of communication for another service implemented based on the Uu interface or whether the delay meets the QoS requirement.

It is to be understood that the terminal device 500 may correspond to a terminal device in the method 200, may realize corresponding functions of the terminal device and will not be elaborated herein for simplicity.

Figure 6:
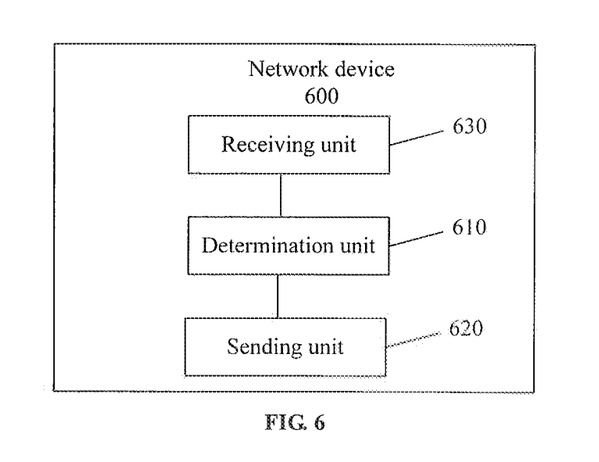
FIG. 6 is a schematic block diagram of a network device according to an embodiment.

FIG. 6 is a schematic block diagram of a network device 600 according to an embodiment of the disclosure. As illustrated in FIG. 6, the network device 600 includes the following units.

A determination unit 610, configured to determine that D2D communication is required to be performed for a first service, wherein present communication for the first service is implemented based on a Uu interface.

A sending unit 620, configured to send indication information to a terminal device, wherein the indication information is configured to indicate communication for the first service to be switched from a Uu-interface-based communication manner to a D2D communication manner.

In at least one embodiment, the indication information further includes a resource for D2D communication.

In at least one embodiment, as illustrated in FIG. 6, the network device 600 further includes a receiving unit 630. The receiving unit 630 may be configured to receive communication quality or communication delays of multiple services from the terminal device, wherein the multiple services include the first service.

The determination unit 610 may be configured to determine that D2D communication is required to be performed for the first service according to the present communication quality or communication delays of the multiple services received by the receiving unit.

It is to be understood that the network device 600 may correspond to a network device in the method 200, may realize corresponding functions of the network device and will not be elaborated herein for simplicity.

Figure 7:
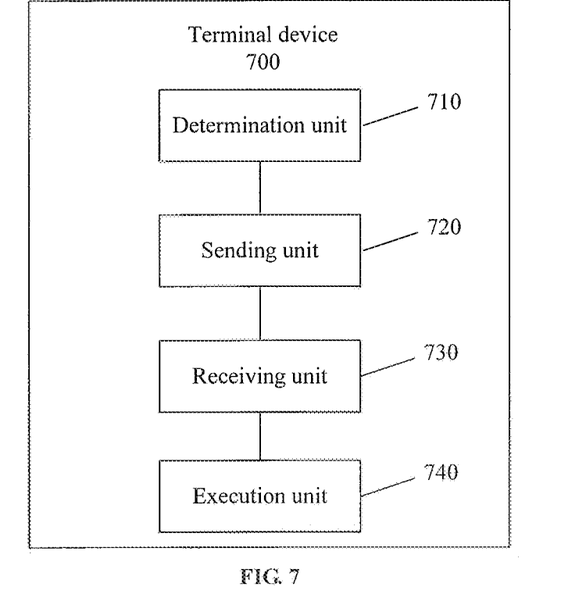
FIG. 7 is a schematic block diagram of a terminal device according to an embodiment.

FIG. 7 is a schematic block diagram of a terminal device 700 according to an embodiment of the disclosure. As illustrated in FIG. 7, the terminal device 600 includes the following units.

A determination unit 710, configured to determine an amount of data to be sent under a present D2D communication manner.

A sending unit 720, configured to report the amount of data to a network device.

A receiving unit 730, configured to receive a resource allocation message sent by the network device.

An execution unit 740, configured to, when the receiving unit receives the resource allocation message sent by the network device, perform D2D communication for the data to be sent through a resource indicated by the resource allocation message, wherein the resource allocation message is configured to indicate resources allocated for performing D2D communication for the data to be sent, and when the receiving unit fails to receive the resource allocation resource, perform D2D communication through an idle resource in a resource pool, wherein the resource pool includes a resource available for D2D communication.

In at least one embodiment, the execution unit 740 may further be configured to: when the resource allocation message is not received when a first timer is ended, adopt the idle resource in the resource pool to perform D2D communication.

When the resource allocation message allocated by the network device is received within a second timer started after the first timer is ended, the terminal device stops performing communication for the first service by adopting the idle resource and adopts the resource indicated by the resource allocation message to perform communication for the first service in the D2D communication manner.

In at least one embodiment, the receiving unit 730 may further be configured to; receive a scrambling sequence number sent by the network device and receive the resource allocation message sent by the network device according to the amount of data by use of the scrambling sequence number.

It is to be understood that the terminal device 700 may correspond to a terminal device in the method 300, may realize corresponding functions of the terminal device and will not be elaborated herein for simplicity.

Figure 8:
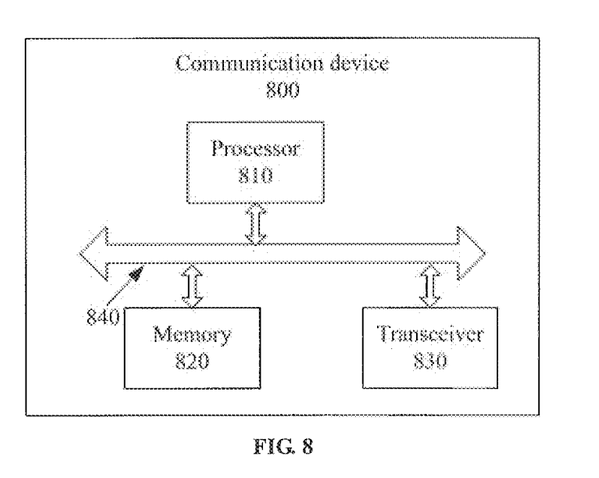
FIG. 8 is a schematic block diagram of a communication device according to an embodiment.

FIG. 8 is a schematic block diagram of a communication device 800 according to an embodiment of the disclosure. As illustrated in FIG. 8, the communication device 800 includes a processor 810, a memory 820 and a transceiver 830. In at least one embodiment, the communication device further includes a bus system 840, and the bus system is configured to interconnect the processor 810, the memory 820 and the transceiver 830. The memory 820 is configured to store an instruction, and the processor 810 is configured to call the instruction stored in the memory 820 to perform corresponding operations.

In at least one embodiment, the communication device 800 illustrated in FIG. 8 may perform corresponding operations of a terminal device mentioned in the method embodiment 100, or may perform corresponding operations of a terminal device mentioned in the method embodiment 200, or may perform corresponding operations of a network device mentioned in the method embodiment 200, or may perform corresponding operations of a terminal device mentioned in the method embodiment 300.

For convenient understanding, descriptions will be made below with the corresponding operations of the terminal device mentioned in the method embodiment 100 as an example.

The processor 810 may call the instruction stored in the memory 820 to perform the following operations.

It is determined that communication for a first service presently implemented based on a Un interface fails to meet a communication requirement of the first service, or, the terminal device determines that a radio link failure occurs when communication for the first service is presently implemented based on the Uu interface.

Communication for the first service is performed in a D2D communication manner.

In at least one embodiment, responsive to determining by the terminal device that communication for the first service presently implemented based on the Uu interface fails to meet the communication requirement of the first service, the processor 810 calls the instruction stored in the memory 820 to perform the following operation.

It is determined that a delay of communication for the first service implemented based on the Uu interface fails to meet a QoS requirement of the first service.

In at least one embodiment, the processor 810 calls the instruction stored in the memory 820 to perform the following operations.

It is monitored whether a resource pool for D2D communication comprises an idle resource by use of the transceiver 830.

When the idle resource exists, the idle resource is adopted to perform communication for the first service.

In at least one embodiment, the processor 810 calls the instruction stored in the memory 820 to perform the following operation.

It is determined information of the resource pool through a downlink broadcast channel sent by network device.

In at least one embodiment, responsive to determining by the terminal device that communication for the first service presently implemented based on the Uu interface fails to meet the communication requirement of the first service, the processor 810 calls the instruction stored in the memory 820 to perform the following operations.

A first message is sent to the network device through the transceiver 830, wherein the first message is configured to indicate that communication for the first service implemented based on the Uu interface fails to meet the communication requirement of the first service.

A second message sent by the network device is received through the transceiver 830, wherein the second message is configured to indicate a resource configured for the terminal device to perform communication for the first service in a D2D mode.

The terminal device adopts the resource pre-configured for the terminal device by the network device to perform communication for the first service in the D2D communication manner.

In at least one embodiment, the processor 810 calls the instruction stored in the memory 820 to perform the following operations.

When the second message is received through the transceiver 830 after the idle resource in the resource pool for D2D communication is adopted to perform communication for the first service, the idle resource is stopped from adopting to perform communication for the first service and the resource configured for the terminal device by the network device is adopted to perform communication for the first service in the D2D communication manner.

In at least one embodiment, the processor 810 calls the instruction stored in the memory 820 to perform the following operations.

When the second message is not received within a first timer through the transceiver 830, the idle resource in the resource pool is adopted for D2D communication to perform communication for the first service.

When the second message is received through the transceiver 830 within a second timer started after the first timer expires, the idle resource is stopped from adopting to perform communication for the first service and the resource configured for the terminal device by the network device is adopted to perform communication for the first service in the D2D communication manner.

In at least one embodiment, the processor 810 calls the instruction stored in the memory 820 to perform the following operations.

A scrambling sequence number sent by the network device is received by use of the transceiver 830.

An amount of data to be sent to the network device is reported by use of the transceiver 830.

By use of the scrambling sequence number, the second message sent by the network device according to the amount of data is received through the transceiver 830.

In at least one embodiment, the processor 810 calls the instruction stored in the memory 820 to perform the following operation.

The resource pre-configured for the terminal device by the network device is adopted to perform communication for the first service in the D2D communication manner.

For convenient understanding, descriptions will be made below with the corresponding operations of the terminal device mentioned in the method embodiment 200 as an example.

The processor 810 calls the instruction stored in the memory 820 to perform the following operations.

Indication information sent by network device is received through the transceiver 830, wherein the indication information may be configured to indicate communication for a first service to be switched from a Uu-interface-based communication manner to a D2D communication manner.

Communication for the first service is performed in the D2D communication manner.

In at least one embodiment, the processor 810 calls the instruction stored in the memory 820 to perform the following operations.

It is monitored whether a resource pool for D2D communication comprises an idle resource through the transceiver 830.

When the idle resource exists, the idle resource is adopted to perform communication for the first service.

In at least one embodiment, the indication information further includes a resource for D2D communication.

The processor 810 calls the instruction stored in the memory 820 to perform the following operation.

Communication for the first service is performed in the D2D communication manner by adopting the resource indicated by the indication information.

In at least one embodiment, the processor 810 calls the instruction stored in the memory 820 to perform the following operation.

A notification message is sent to the network device through the transceiver 830, wherein the notification message may be configured to indicate a delay of communication for the first service implemented based on a Uu interface or whether the delay meets a QoS requirement.

In at least one embodiment, the notification message may further be configured to indicate a delay of communication for another service implemented based on the Uu interface or whether the delay meets the QoS requirement.

For convenient understanding, descriptions will be made below with the corresponding operations of the network device mentioned in the method embodiment 200 as an example.

The processor 810 calls the instruction stored in the memory 820 to perform the following operations.

It is determined that D2D communication is required by a first service for which communication is presently implemented based on a Uu interface.

Indication information is sent to a terminal device through the transceiver 830, wherein the indication information may be configured to indicate communication for the first service to be switched from a Uu-interface-based communication manner to a D2D communication manner.

In at least one embodiment, the indication information further includes a resource for D2D communication.

In at least one embodiment, the processor 810 calls the instruction stored in the memory 820 to perform the following operations.

Communication quality or communication delays of multiple services are received from the terminal device through the transceiver 830, wherein the multiple services may include the first service.

It is determined that D2D communication is required to be performed for the first service according to the present communication quality or communication delays of the multiple services.

For convenient understanding, descriptions will be made below with the corresponding operations of the terminal device mentioned in the method embodiment 300 as an example.

The processor 810 calls the instruction stored in the memory 820 to perform the following operations.

An amount of data to be sent is determined under a present D2D communication manner.

The amount of data is reported to a network device through the transceiver 830.

When a resource allocation message sent by the network device is received through the transceiver 830, D2D communication for the data to be sent is performed through a resource indicated by the resource allocation message, wherein the resource allocation message is configured to indicate resources allocated for performing D2D communication for the data to be sent.

When the resource allocation message is not received through the transceiver 830, the D2D communication is performed through an idle resource in a resource pool, wherein the resource pool includes a resource available for D2D communication.

In at least one embodiment, the processor 810 calls the instruction stored in the memory 820 to perform the following operations.

When the resource allocation message is not received through the transceiver 830 when a first timer expires, the idle resource in the resource pool is adopted to perform D2D communication.

When the resource allocation message allocated by the network device is received through the transceiver 830 within a second timer started after the first timer expires, the idle resource is stopped from adopting to perform communication for a first service and the resource indicated by the resource allocation message is adopted to perform communication for the first service in the D2D communication manner.

In at least one embodiment, the processor 810 calls the instruction stored in the memory 820 to perform the following operations.

A scrambling sequence number sent by the network device is received through the transceiver 830.

The resource allocation message sent by the network device is received according to the amount of data through the transceiver 830 by use of the scrambling sequence number.

Those of ordinary skill in the art may realize that the units and algorithm operations of each example described in combination with the embodiments disclosed in the disclosure may be implemented by electronic hardware or a combination of computer software and the electronic hardware. Whether these functions are performed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, network equipment or the like) to perform all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
   determining, by a terminal device, that communication for a first service presently implemented based on a Uu interface fails to meet a communication requirement of the first service, or, determining, by the terminal device, that a radio link failure occurs when communication for the first service is presently implemented based on the Uu interface; and
   performing, by the terminal device, communication for the first service in a Device to Device (D2D) communication manner,
   the method further comprising:
   determining, by the terminal device, an amount of data to be sent in the D2D communication manner;
   reporting, by the terminal device, the amount of data to a network device;
   when a resource allocation message sent by the network device is received, performing D2D communication for the data to be sent through a resource indicated by the resource allocation message, wherein the resource allocation message is configured to indicate resources allocated for performing D2D communication for the data to be sent; and
   when the resource allocation message is not received, performing the D2D communication through an idle resource in a resource pool, wherein the resource pool comprises a resource available for D2D communication.

2. The method according to claim 1, wherein determining, by the terminal device, that communication for the first service presently implemented based on the Uu interface fails to meet the communication requirement of the first service comprises:
   determining, by the terminal device, that a delay of communication for the first service implemented based on the Uu interface fails to meet a Quality of Service (QoS) requirement of the first service.

3. The method according to claim 1, wherein performing, by the terminal device, communication for the first service in the D2D communication manner comprises:
   monitoring, by the terminal device, whether a resource pool for D2D communication comprises an idle resource; and
   when the idle resource exists, performing communication for the first service by adopting the idle resource.

4. The method according to claim 3, before monitoring, by the terminal device, whether the resource pool for D2D communication comprises the idle resource, further comprising:
   determining information of the resource pool through a downlink broadcast channel sent by a network device.

5. The method according to claim 1, further comprising:
   responsive to determining by the terminal device that communication for the first service presently implemented based on the Uu interface fails to meet the communication requirement of the first service,
sending, by the terminal device, a first message to the network device, wherein the first message is configured to indicate that communication for the first service implemented based on the Uu interface fails to meet the communication requirement of the first service; and
receiving, by the terminal device, a second message sent by the network device, wherein the second message is configured to indicate a resource configured for the terminal device to perform communication for the first service in a D2D mode;
wherein performing, by the terminal device, communication for the first service in the D2D communication manner comprises: adopting, by the terminal device, the resource configured by the network device to perform communication for the first service in the D2D communication manner.

6. The method according to claim 5, wherein performing, by the terminal device, communication for the first service in the D2D communication manner comprises:
when the terminal device receives the second message after adopting the idle resource in the resource pool for D2D communication to perform communication for the first service, stopping, by the terminal device, performing communication for the first service by adopting the idle resource, and adopting the resource configured for the terminal device by the network device to perform communication for the first service in the D2D communication manner.

7. The method according to claim 6, wherein performing, by the terminal device, communication for the first service in the D2D communication manner comprises:
when the second message is not received within a first timer, adopting the idle resource in the resource pool for D2D communication to perform communication for the first service; and
when the second message is received within a second timer started after the first timer expires, by the terminal device, stopping, by the terminal device, performing communication for the first service by adopting the idle resource, and adopting the resource configured for the terminal device by the network device to perform communication for the first service in the D2D communication manner.

8. The method according to claim 5, before receiving, by the terminal device, the second message sent by the network device, further comprising:
receiving, by the terminal device, a scrambling sequence number sent by the network device; and
reporting, by the terminal device, an amount of data to be sent to the network device;
wherein receiving, by the terminal device, the second message sent by the network device comprises: receiving the second message sent by the network device according to the amount of data by use of the scrambling sequence number.

9. The method according to claim 1, wherein performing, by the terminal device, communication for the first service in the D2D communication manner comprises:
performing communication for the first service in the D2D communication manner by adopting a preconfigured resource, wherein the preconfigured resource is configured for the terminal device by the network device.

10. A communication method, comprising:
receiving, by a terminal device, indication information sent by a network device, wherein the indication information is configured to indicate communication for a first service to be switched from a Uu-interface-based communication manner to a Device to Device (D2D) communication manner; and
performing, by the terminal device, communication for the first service in the D2D communication manner,
the method further comprising:
determining, by the terminal device, an amount of data to be sent in the D2D communication manner;
reporting, by the terminal device, the amount of data to a network device;
when a resource allocation message sent by the network device is received, performing D2D communication for the data to be sent through a resource indicated by the resource allocation message, wherein the resource allocation message is configured to indicate resources allocated for performing D2D communication for the data to be sent; and
when the resource allocation message is not received, performing the D2D communication through an idle resource in a resource pool, wherein the resource pool comprises a resource available for D2D communication.

11. The method according to claim 10, wherein performing, by the terminal device, communication for the first service in the D2D communication manner comprises:
monitoring, by the terminal device, whether a resource pool for D2D communication comprises an idle resource; and
when the idle resource exists, performing communication for the first service by adopting the idle resource.

12. The method according to claim 10, wherein the indication information further comprises a resource for D2D communication; and
performing, by the terminal device, communication for the first service in the D2D communication manner comprises:
performing, by the terminal device, communication for the first service in the D2D communication manner by adopting the resource indicated by the indication information.

13. The method according to claim 10, before receiving, by the terminal device, the indication information sent by the network device, further comprising:
sending, by the terminal device, a notification message to the network device, wherein the notification message is configured to indicate a delay of communication for the first service implemented based on a Uu interface or whether the delay meets a Quality of Service (QoS) requirement.

14. The method according to claim 13, wherein the notification message is further configured to indicate a delay of communication for another service implemented based on the Uu interface or whether the delay meets the QoS requirement.

15. The method according to claim 10, further comprising:
determining, by the terminal device, an amount of data to be sent in the D2D communication manner;
reporting, by the terminal device, the amount of data to the network device;
when a resource allocation message sent by the network device is received, performing D2D communication for the data to be sent through a resource indicated by the resource allocation message, wherein the resource allocation message is configured to indicate resources allocated for performing D2D communication for the data to be sent; and when the resource allocation message is not received, performing the D2D communication through an idle resource in a resource pool, wherein the resource pool comprises a resource available for D2D communication.

16. The method according to claim 1, wherein performing the D2D communication through the idle resource in the resource pool comprises: when the resource allocation message is not received until a first timer expires, adopting the idle resource in the resource pool to perform D2D communication; and performing D2D communication for the data to be sent through the resource indicated by the resource allocation message comprises:

when the resource allocation message allocated by the network device is received within a second timer started after the first timer expires, stopping, by the terminal device, performing communication for the first service by adopting the idle resource, and adopting the resource indicated by the resource allocation message to perform communication for the first service in the D2D communication manner.

17. The method according to claim 1, further comprising:
receiving, by the terminal device, a scrambling sequence number sent by the network device; and
receiving the resource allocation message sent by the network device according to the amount of data by use of the scrambling sequence number.

18. A terminal device, comprising: a memory and a processor, the memory storing one or more computer programs that, when executed by the processor, cause the processor to execute operations comprising:

determining that communication for a first service presently implemented based on a Uu interface fails to meet a communication requirement of the first service, or, determining that a radio link failure occurs when communication for the first service, is presently implemented based on the Uu interface; and performing communication for the first service in a Device to Device (D2D) communication manner, wherein the operations further comprise:
determining an amount of data to be sent in the D2D communication manner;
reporting the amount of data to a network device;
when a resource allocation message sent by the network device is received, performing D2D communication for the data to be sent through a resource indicated by the resource allocation message, wherein the resource allocation message is configured to indicate resources allocated for performing D2D communication for the data to be sent; and when the resource allocation message is not received, performing the D2D communication through an idle resource in a resource pool, wherein the resource pool comprises a resource available for D2D communication.

19. The terminal device according to claim 18, wherein performing the D2D communication through the idle resource in the resource pool comprises: when the resource allocation message is not received until a first timer expires, adopting the idle resource in the resource pool to perform D2D communication; and performing D2D communication for the data to be sent through the resource indicated by the resource allocation message comprises:

when the resource allocation message allocated by the network device is received within a second timer started after the first timer expires, stopping, by the terminal device, performing communication for the first service by adopting the idle resource, and adopting the resource indicated by the resource allocation message to perform communication for the first service in the D2D communication manner.

20. The terminal device according to claim 18, wherein the operations further comprise:

receiving a scrambling sequence number sent by the network device; and
receiving the resource allocation message sent by the network device according to the amount of data by use of the scrambling sequence number.

* * * * *